Sept. 1, 1959  R. L. HARTUNG  2,902,647
FREQUENCY RESPONSIVE DEVICE
Filed June 15, 1955
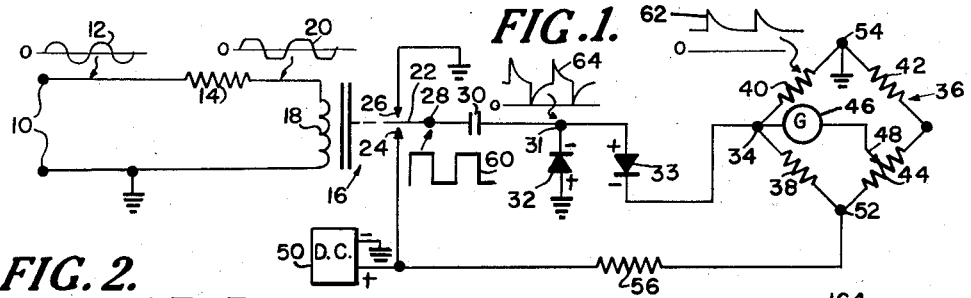
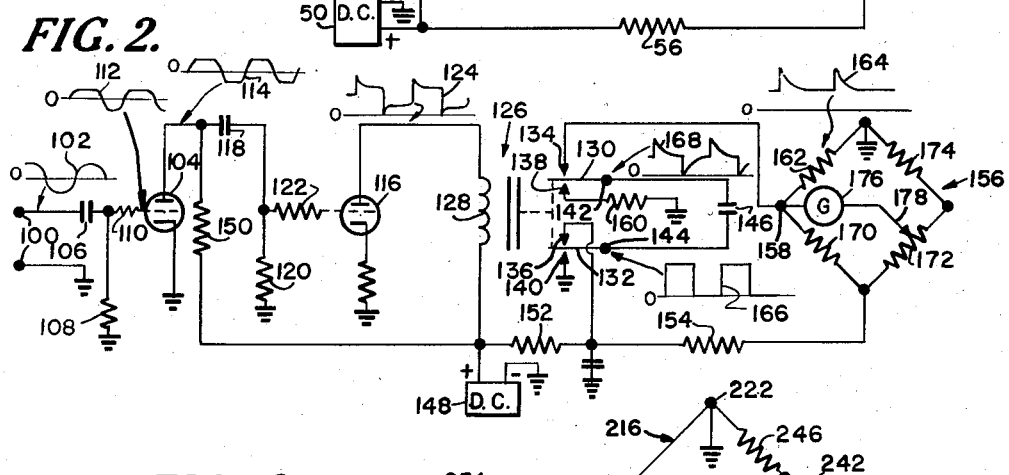
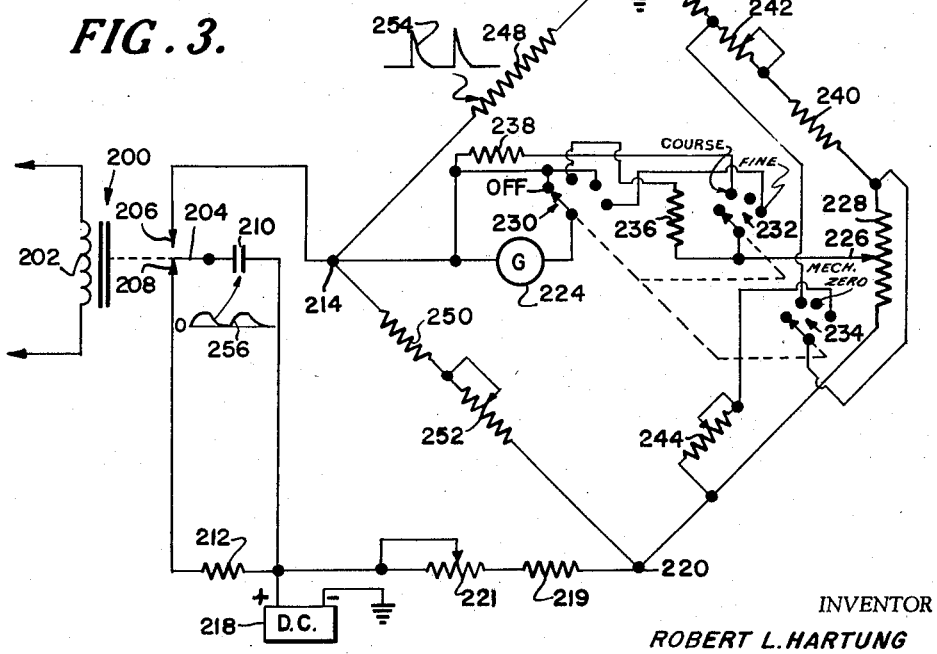
INVENTOR
ROBERT L. HARTUNG
BY
*Cushman, Darby & Cushman*
ATTORNEYS United States Patent Office 2,902,647
Patented Sept. 1, 1959

2,902,647

FREQUENCY RESPONSIVE DEVICE

Robert L. Hartung, Fort Worth, Tex., assignor to B & H Instrument Co., Inc., Fort Worth, Tex., a corporation of Texas Application June 15, 1955, Serial No. 515,657

20 Claims. (Cl. 324—78)

This invention relates to a frequency responsive device and particularly to measuring the frequency of signals applied thereto.

Such instruments are particularly useful, for example, in measuring the frequency of tachometer-generators or the like or controlling the speed of motor generator sets. Frequently the speed to be controlled must be held within exceptionally narrow limits. Likewise, when the instrument is used to measure frequencies in a large range of frequencies, the requirement for accurate measurements throughout the whole range often appears. Apparatus made in accordance with the present invention is known to provide at least an accuracy of .1 of 1% at 70 cycles per second throughout a temperature range of —40° to 135° F. Similar accuracy is possible while measuring frequencies in a range, for example, corresponding to 200 to 7500 r.p.m.

It is, therefore, the principal object of this invention to provide a frequency responsive device having a high degree of accuracy.

Another object of the invention is to provide a battery operated frequency measuring system employing a relay in a bridge circuit for accurate measurement of the input frequency to the instrument without consuming substantial power from the power source or the input frequency means.

Another object of the invention is to provide a frequency measuring system employing a relay and a condenser in a differentiating circuit in conjunction with a bridge circuit in a manner such that the condenser is charged during each cycle of the input signal to be measured, through an impedance in the bridge circuit, the bridge thereby becoming unbalanced in proportion to the frequency of the input signal while said condenser is discharged during the remaining portions of the input cycles without affecting the bridge.

Another object in conjunction with the preceding object is to provide a frequency measuring system employing vacuum tube buffer stages which present a high impedance to the input signal and consequently prevent substantial consumption of power therefrom.

Another object of the invention is to provide a frequency measuring system employing a relay to provide a constant amplitude differentiated signal, the differentiated portions thereof being of like duration for any input signal applied to the frequency measuring system.

Another object of the invention is to provide a frequency measuring system employing a relay having two armature poles each movable to two positions and a condenser connected between the armature poles so that when the poles are in one position, the condenser is charged, and when in their other position, the condenser is discharged, the frequency of charge and discharge of the condenser being an indication of the frequency of the input signal applied to the frequency measuring system.

Another object of the invention is to provide a frequency measuring system employing a relay and condenser in such a manner that the relay is connected and disconnected to a charge circuit at a rate equal to the frequency of the input signal applied to the frequency measuring system.

Further objects and the entire scope of the invention will become further apparent from the following detailed description of exemplary embodiments of the various phases of the invention.

Exemplary embodiments according to the invention may be best understood with reference to the accompanying drawings in which:

Figure 1 is a battery operable frequency responsive circuit;

Figure 2 is a frequency responsive circuit operable by a rectified alternating current power supply; and Figure 3 is a modification of the relay, bridge and differentiating circuitry applicable to either the instruments illustrated in Figures 1 and 2.

Figure 1 illustrates a frequency responsive system which may be utilized to measure the frequency of a signal received at terminals 10. Waveform 12 illustrates a sine wave being received at terminals 10, however, the invention herein described is not limited to input signals being a sine wave, since a non-sinusoidal signal will operate the frequency measuring system as well. Connected in series with the upper input line from terminals 10 is a non-linear impedance such as resistor 14. Since the input signal 12 varies both positively and negatively, a polarized relay 16 is utilized. In conjunction with the coil 18 of the relay, the non-linear impedance 14 "clips" both the positive and negative tips of the sine wave 12 to cause a waveform 20 having substantially a square wave configuration to be presented to the energizing coil 18. Relay 16 has an armature 22 normally resting midway between two contact points 24 and 26.

Since relay 16 is a polarized relay, each half cycle of the waveform 20 will cause armature 22 to move in one direction or the other. For the purpose of illustration, it is assumed with reference to Figure 1 that the positive portion of waveform 20 causes armature 22 to move against contact point 24, and that the negative portion of waveform 20 causes armature 22 to move against contact point 26.

Connected to the pivoting terminal 28 of armature 22 is a condenser 30, the other side of which is connected to terminal 31 from which a unidirectional current conducting device 32 connects to ground and from which another unidirectional current conducting device 33 connects to terminal 34 of a bridge circuit 36.

It is to be understood that conventional current flow through the unidirectional devices 32 and 33 is from the arrow-head toward the bar when the arrow-head is more positive (+) than the bar. Current will not flow reversely when the bar is more positive than the arrow-head.

The bridge circuit 36 is of a balanceable type having resistors 38, 40, and 42 in three legs thereof with potentiometer 44 in its fourth leg. A galvanometer 46 is connected between terminal 34 and the movable arm 48 of potentiometer 44.

A source of well regulated direct voltage 50 as from a battery is connected across opposite terminals 52 and 54 of the bridge circuit 36 via dropping resistor 56. Contact point 24 is connected to the positive terminal of voltage source 50, while contact point 26 connects to the negative or ground side of voltage source 50.

The operation of the device is as follows: As assumed above, the positive portion of waveform 20 causes armature 22 to move against contact point 24 and establish a charging circuit branch including condenser 30, resistor 40, and unidirectional device 33. Therefore, during this time condenser 30 will be charged by voltage source 50 through resistor 40 and the unidirectional device 33. Resistor 40 and unidirectional device 33 will affect the charging voltage across condenser 30 and the impedance values thereof along with that of condenser 30 will determine the RC time constant of the charging circuit branch. When the negative cycle of waveform 20 causes armature 22 to move upwards against contact point 26 to establish a discharging circuit branch including condenser 30 and unidirectional device 32, the condenser is discharged through unidirectional device 32 to ground. Therefore, it will be seen that terminal 28 receives voltage from source 50 only during the time when armature 22 is downward and, consequently, the waveform at terminal 28 is a square wave as illustrated by waveform 60. The positive-going portions of square wave 60 are differentiated by resistor 40 and unidirectional device 33 to produce pulses or "spikes" of voltage across resistor 40, as illustrated by waveform 62, while the negative-going spikes illustrated in waveform 64 are unable to pass unidirectional device 33 but are grounded through unidirectional device 32.

The time constants of the charging and discharging circuit branches are regulated so that condenser 30 (and its homologues in Figures 2 and 3) is charged and discharged to a predetermined extent during each cycle of the input signal at terminals 10. For an instrument which is to determine the frequency of signals within a range of frequencies, the time constants of the charging and discharging circuit branches of Figure 1 (as well as those in Figures 2 and 3) are made such that the condenser may be fully charged and fully discharged during the time periods for successive half cycles, respectively, of the highest frequency in the range. Therefore, the pulses or spikes across resistor 40 will be of one form; that is, they will have not only substantially equal amplitudes but substantially equal durations, regardless of the frequency being measured, with only the number of spikes per unit of time varying with the input frequency at terminals 10.

In Figure 1, when no signal is received at terminals 10, no spikes are applied to the bridge 36. The current from voltage source 50 will divide evenly through resistors 38, 40 to ground and resistors 44, 42 to ground at which time the potentiometer arm 48 is regulated to provide a balanced indication on the galvanometer 46. However, when a signal is applied at terminals 10, each spike of voltage as illustrated in waveform 62 appears across resistance 40. Since the spikes are of constant amplitude and duration regardless of the frequency of the input at terminals 10, but vary in number directly with the frequency of such an input, a new point of balance of the bridge 36 will occur with each different input frequency.

It should be noted that not only the positive-going spikes but also the negative-going spikes of waveform 64 could be utilized by themselves to unbalance the bridge 36. In this respect, unidirectional devices 32 and 33 may be reversed as to their current conducting direction so that condenser 30 may be charged through unidirectional device 32 and discharged through resistor 40 and unidirectional device 33. Under such conditions only the negative-going spikes of waveform 64 would appear across resistor 40, but a rebalance of the bridge would still be obtainable to indicate the frequency of the input signal to terminals 10. Whether the bridge is unbalanced by either positive or negative-going spikes, e.g., whether condenser 30 is charged or discharged through resistor 40, potentiometer 44 can be calibrated to read directly in units proportional to the input frequency.

It is preferable that some means (not shown) be provided to set the voltage from source 50 as applied to the relay 16 and the bridge 36 to a predetermined value. In this respect, a switch may be provided to switch the galvanometer and a standard cell (not shown) across one of the bridge resistors, while the input signal to terminals 10 is removed. The input voltage from source 50 can be varied so that the voltage drop across said one bridge resistor is equal to the standard cell voltage to provide a zero reading of the galvanometer. The relay voltage would also be standardized by this procedure.

The circuitry illustrated in Figure 1 is particularly applicable to a battery operated frequency measuring instrument. The source of voltage 50 may be in the neighborhood of 30 volts since power consumption by the instrument is comparatively small, there being no vacuum tubes in the instrument to consume a large amount of power.

When power consumption is not particularly a factor and an alternating current supply is available to produce a regulated power supply adequate to provide the necessary balancing current through the bridge circuit, vacuum tube buffer stages may be utilized. Figure 2 illustrates circuitry of this type. Terminals 100 receive a signal having a waveform similar to waveform 102 from a tachometer generator or the like and apply it to tube 104 through grid coupling condenser 106 and grid resistors 108 and 110 to the control grid of tube 104. Tube 104 is operated so that grid current will flow on the positive portion of the input signal received at its grid and, consequently, the positive tips of waveform 102 are removed by the voltage drop across non-linear resistance 110 to produce a waveform such as waveform 112. Furthermore, tube 104 may be an amplifier operated so that the input thereto drives the tube to cut-off, thereby partially removing the negative tips of the input waveform 112 within the tube, resulting in the amplified but clipped waveform 114 at the plate of tube 104. The output of tube 104 is coupled to tube 116 by condenser 118 and resistors 120 and 122. The operation of this buffer stage is similar to that above-described for the previous buffer stage having vacuum tube 104. Tube 116 and its attendant circuitry operates to square the input waveform 114 to produce a waveform like waveform 124 at the plate of tube 116. A source of voltage 148 provides the necessary operating current to tube 104 through resistor 150 and to tube 116 through coil 128.

Since the output from tube 116 is unidirectional, though alternatingly unidirectional (i.e., it is always above zero but varies from a value near zero to some fixed maximum value above zero and back again), a non-polarized type relay may be used. Such a relay is indicated generally by numeral 126. This relay has an energizing coil 128 and armature means comprising an upper pole 130 and a lower pole 132, each movable to two positions against either the upper contact points 134, 136 or the lower contact points 138, 140. Since the coil 128 presents a high impedance to the output of tube 116 during the transit times of poles 130, 132, the leading edges of waveform 124 are peaked. This produces a definite step motion to the poles 130 and 132 of the relay and assures that the poles move against their respective contact points substantially at the beginning of each half cycle of the sine wave 102.

Between the pivoting terminals 142 and 144 of the upper and lower poles is connected a condenser 146. The charging contact point 136 of the lower pole 132 is connected to the positive side of voltage source 148 through dropping resistor 152, the voltage source being further connected through resistance 154 to a bridge circuit 156 similar in all respects to bridge circuit 36 of Figure 1. The other charging contact point 134 is connected to junction 158 of the bridge, and the discharging contact points 138, 140 are connected to ground, the former through resistor 160.

The operation of the relay and bridge circuitry illustrated in Figure 2, is as follows: During the more positive portions of waveform 124 through energizing coil 128, the upper and lower poles 130, 132 move against upper contact points 134 and 136 to establish a charging circuit branch including condenser 146 and resistor 162.

Therefore, condenser 146 is charged by the voltage source 148 through resistor 162 of the bridge. Resistor 162, consequently, affects the voltage across condenser 146 and vice versa. The resultant unbalancing pulses or spikes across resistor 162 are illustrated in waveform 164. During the negative going portions of waveform 124, the energizing coil 123 causes armature poles 130, 132 to move downward against contact points 138 and 140. The charge on condenser 146 is then removed by shorting the condenser through resistor 160 to ground. The resultant waveforms at the pivoting terminals 142 and 144 of the armature poles are illustrated respectively by waveforms 166 and 168. It will be noted that the negative-going spikes of waveform 168 are not present across resistor 162.

As in Figure 1, the current from voltage source 148 of Figure 2 is balanced through resistors 170, 162 to ground and potentiometer 172 and resistor 174 to ground, a balanced indication being regulated to show on galvanometer 176 by adjustment of the potentiometer arm 178. Therefore, the voltage pulses across resistance 162 as illustrated by waveform 164 unbalances the opposing currents through galvanometer 176 as in the bridge circuit for Figure 1. Again, as in Figure 1, the bridge 156 may also be unbalanced by the discharge of condenser 146 through the affecting resistor 162, i.e., by the negative-going spikes of waveform 168. This may be accomplished simply, for example, by interchanging the connections to contact points 134 and 138 or by interchanging the connections to contact points 136 and 140. Also, as in Figure 1, the spikes of waveform 164 are of constant amplitude and duration but vary in number directly with the input of the signal to terminals 100. Consequently, a calibrated potentiometer 172 may read directly in units proportional to the input frequency of waveform 102.

It will be apparent that the relays 16 of Figure 1 and 126 of Figure 2 may be interchanged, i.e., a double-pole double-throw relay may be utilized in Figure 1 instead of the illustrated single-pole double-throw relay, and vice versa.

As a further and preferable modification of this invention, Figure 3 illustrates relay, bridge, and differentiating circuitry which may operate with either the battery operated set illustrated in Figure 1 or the vacuum tube operated set as illustrated in Figure 2. The relay 200 has an energizing coil 202 and an armature 204 movable in two directions against either contact points 206 or 208. Preferably, armature 204 is held against contact point 208 during the time when a negative-going current energizes coil 202 or when no current passes therethrough.

In this embodiment, condenser 210 is connected to the pivoting terminal of armature 204, and when the armature is touching the lower contact point 208 to establish a discharging circuit branch, condenser 210 is shorted by, and discharged through, resistor 212. The upper charging contact point 206 is coupled to junction 214 of a bridge circuit 216 and establishes a charging circuit branch when in contact with armature 204. The bridge circuit 216 is similar to the previously described bridges in Figures 1 and 2, but refinements thereto are illustrated in Figure 3, these refinements being applicable as well to the bridges of Figures 1 and 2.

Voltage source 218 is connected via resistor 219 and current regulating rheostat 221, to junctions 220, 222 of the bridge circuit, while a galvanometer 224 connects between junction 214 and the movable arm 226 of potentiometer 228 through two four-position switches 230 and 232. A third switch 234 likewise has four positions, and all three of the arms of switches 230, 232 and 234 are mechanically connected together to make contacts respectively at their four positions. From left to right, as illustrated in Figure 3, the four positions of each of switches are, respectively, "off," "coarse," "mechanical zero," and "fine." When switch 230 is in its "off" or "mechanical zero" position, galvanometer 224 is shorted to prevent currents from entering the galvanometer. "Coarse" and "fine" refer to large and small scales, respectively, for the galvanometer. When all three of the switches 230, 232 and 234 are in their "coarse" position, galvanometer 224 is shunted by resistors 236 and 238 by switches 230 and 232, while switch 234 shorts resistor 240 and rheostat 242. The balancing of the opposing currents through galvanometer 224 is, during this time, accomplished by adjustment of potentiometer arm 226. When the switches 230, 232, and 234 are in their "fine" position, the "coarse" scale resistors 236 and 238 are disconnected from the galvanometer 224 so that the galvanometer is connected directly to potentiometer arm 226. Switch 234 at this time places rheostat 244 across potentiometer 228 for a more accurate balancing of the opposing currents through galvanometer 224 when a reading is being made on the "fine" scale. Resistor 246 is in the upper righthand leg of the bridge at all times. Likewise, resistor 248 is constantly in the upper lefthand leg of the bridge, while resistor 250 and rheostat 252 are in the lower lefthand leg of the bridge. Rheostat 252, as well as rheostat 242, permits balancing of the resistances in their respective current paths.

In the modification of Figure 3, it will be noted that condenser 210 is connected constantly between armature 204 and the positive side of voltage source 218. Therefore, when armature 204 is held against the upper charging contact point 206, voltage source 218, connected at its negative side via ground to junction 222 of the bridge circuit, charges condenser 210 through resistor 248 to produce positive spikes thereacross such as the pulses in waveform 254. When armature 204 is held against the lower discharging contact point 208, the charge on condenser 210 is removed therefrom by shorting resistor 212. Therefore, condenser 210 will be charged and discharged alternatively and will have a voltage waveform similar to that illustrated by waveform 256, the upward slope occurring during the charging time and the downward slope occurring during the discharging time. Since the armature 204 is downward during the discharging time, only the positive, differentiated spikes appear across resistor 248. The charging time of the condenser 210 is determined by the size of resistor 248, while the discharging time of condenser 210 is similarly determined by the size of resistor 212. The remainder of the operation of the bridge circuit is similar to that described for the previous bridge circuits, the spikes of waveform 254 causing an unbalancing of the bridge as indicated by galvanometer 224. That is, the galvanometer 224 integrates the opposing currents therethrough and particularly the unbalancing spikes of waveform 254 and indicates the repetitive rate of the spikes, each spike indicating one cycle of the frequency being determined. As in the previous embodiments, the bridge may be unbalanced by the discharging of condenser 210 through resistor 248 to determine the unknown frequency as by interchanging the leads from source 218 at the junctions 220 and 222 and connecting resistor 212 to the grounded side of source 218 instead of to its positive side.

Along with the relay, bridge, and differentiating circuitry illustrated in each of Figures 1, 2 and 3, the accuracy of the measurement of frequencies is enhanced by utilizing temperature compensating condensers and resistors therein. For example, without limitation being intended, the component parts of the preferred embodiment illustrated in Figure 3 may have resistive and tolerance values as listed hereinbelow, with the resistors being carbon resistors unless indicated as being wire wound by the abbreviation WW.

| | |
|---|---|
| Relay 200 | 3360 ohms. |
| Condenser 210 | .1 mfd. 200 v., 20%. |
| Resistor 212 | 2200 ohms, 10%. |
| Resistor 219 | 7000 ohms, 1%, WW. |
| Rheostat 221 | 1500 ohms. |
| Potentiometer 228 | 400 ohms. |

| | |
|---|---|
| Resistor 236 | 10,000 ohms, 1%, WW. |
| Resistor 238 | 1000 ohms, 1%, WW. |
| Resistor 240 | 370 ohms, 1%, WW. |
| Potentiometer 242 | 40 ohms. |
| Potentiometer 244 | 40 ohms. |
| Resistor 246 | 830 ohms, 1%, WW. |
| Resistor 248 | 1000 ohms, 1%, WW. |
| Resistor 250 | 4400 ohms, 1%, WW. |
| Rheostat 252 | 1500 ohms. |

With the above mentioned temperature compensating condenser and resistors in conjunction with a well regulated voltage source 218, the accuracy of the measuring instrument made in accordance with the illustration in Figure 3 has proved to be at least .1 of 1% at 70 cycles per second throughout a temperature range of −40° to 135° F. In addition, the circuitry will respond to frequencies in a range corresponding to speeds from 200 to 7500 R.P.M. with similar accuracy. The galvanometer utilized is preferably a fast acting galvanometer which will intergrate the spikes of waveform 254 to indicate balance and unbalance of the bridge 216. The galvanometer 224, as well as galvanometers 46 and 176 of Figures 1 and 2, are preferably null balance galvanometers, but the invention is not limited thereto.

Modifications of this invention not described herein will become apparent to those skilled in the art. Therefore, it is intended that the matter contained in the foregoing description and the accompanying drawings be interpreted as illustrative and not limitative, the scope of the invention being defined in the appended claims.

What is claimed is:

1. In a frequency measuring system, a condenser, balanceable bridge means excluding said condenser but including impedance means in one portion thereof, and circuit means including relay means having armature means movable to two positions in response to a fluctuating input signal to the relay means to establish circuit branches for charging and discharging said condenser to produce first polarity pulses and second polarity pulses respectively, only one of said branches being a part of said bridge means and including the bridge impedance means, the arrangement being such that only pulses of one of said polarities is received by the bridge means so that such pulses through said impedance means serve to actuate the bridge means to indicate the frequency of the input to the relay means.

2. Apparatus as in claim 1 wherein the bridge impedance means is in the charging circuit branch.

3. Apparatus as in claim 1 further including means for limiting the respective amplitude swings of the inputs to the relay means.

4. Apparatus as in claim 3 wherein the limiting means includes a non-linear impedance.

5. Apparatus as in claim 3 wherein the limiting means includes vacuum tube buffing means for presenting a high impedance to said inputs.

6. Apparatus as in claim 3 wherein said relay means is a non-polarized relay.

7. Apparatus as in claim 3 wherein the said relay means is a polarized relay.

8. Apparatus as in claim 3 wherein the armature means includes a single pole.

9. Apparatus as in claim 3 wherein the armature means includes two poles, each of which is movable to two positions in response to successive half cycles respectively of said inputs, said condenser being connected between said poles.

10. In a frequency measuring system, a condenser, means to charge the condenser on alternate half-cycles of the frequency being measured, balanceable bridge means excluding said condenser but including impedance means in one portion thereof for determining at least partially a time constant for said condenser, said impedance means being at least connectable to said condenser on alternate half-cycles of the frequency being measured, relay means having armature means movable to two positions in response to a fluctuating input signal derived from the frequency being measured and delivered to the relay means to affect the voltage across said condenser in opposite senses during two successive half-cycles of frequency being measured, and means connected to the relay means and to the condenser on alternate half-cycles of the frequency being measured to discharge said condenser, the arrangement being such that when the armature means is in one of said positions, the voltage across said condenser is affected in one sense, while when the armature means is in the other position, the voltage across the condenser is affected through the impedance means in an opposite sense and thte resultant voltage across the impedance means serves to unbalance the bridge means to indicate the frequency of the inputs to the relay means.

11. Apparatus as in claim 10 wherein said means to charge the condenser is connected across the condenser and the bridge impedance means when the armature means is in said other position.

12. In a frequency measuring system, a condenser, a source of voltage for charging said condenser, a relay having a solenoid and at least two contact points and armature means movable to two positions in response to alternating inputs to the relay solenoid to contact said points, said condenser being connected to the armature means, bridge circuit means excluding said condenser but having a resistor by which the voltage across said condenser is affected and a galvanometer, said bridge means being connected continuously across said voltage source and being adjustable to balance the opposing currents through said galvanometer, and means connected at least in part to one of said contact points to discharge the condenser, the arrangement being such that when the armature means is in one of said positions, the voltage across said condenser is affected by the resistor and the resultant voltage across the resistor serves to unbalance the bridge circuit means to indicate the frequency of the inputs to the relay means.

13. Apparatus as in claim 12 wherein half of the contact points are for charging purposes, said condenser and source being at least connectable thereto, the arrangement being such that when the armature means moves against the charging contact points, the condenser is charged through said resistor by the voltage source, and when the armature means moves against the remainder of the contact points, the condenser is discharged by said discharging means.

14. In a frequency measuring system, relay means having armature means movable between one pair of contact points for producing from the armature means an output related only in frequency to the frequency to be measured, circuit means connectable by the armature means for affecting a portion of the output from said armature means, said circuit means including a condenser connected to the armature means and a unidirectional device and an impedance in series therewith, bridge means including said impedance for receiving said portion of the output and indicating the frequency thereof, a voltage source connected to one of said contact points for charging said condenser, said source being further connected continuously across the bridge means, and unidirectional current means connected to another of said contact points and therefor connectable by the armature means to said condenser for affecting a second portion of the output from said armature means, the arrangement being such that when the condenser is alternately charged and discharged, only the first mentioned output portion is received by said bridge means to unbalance the bridge means to a degree proportional to the frequency of the frequency to be measured.

15. Apparatus as in claim 14 wherein said pair of contact points includes a charging contact point and a discharging contact point and said voltage source is connected to a charging contact point while said unidirectional current means is connected to a discharging contact point for discharging the condenser when the armature means moves against said discharging contact point, the arrangement being such that said condenser is charged through said impedance to cause the bridge means to be unbalanced.

16. In a frequency measuring system, relay means having an armature with two poles each movable between charging and discharging contact points for producing an output related only in frequency to the frequency to be measured, circuit means connectable by the armature for affecting a portion of the output of said relay means, said circuit means including a condenser connected between the armature poles and an impedance, bridge means including said impedance for receiving said portion of the output and indicating the frequency thereof, a source of voltage connected to the charging contact point of one pole for charging said condenser, said source being further connected continuously across the bridge means, and means connected to one of the contact points of the other pole for affecting a second portion of the output of said relay means, the other contact point of said other pole being connected to the bridge means, the arrangement being such that when the condenser is alternately charged and discharged, only the first mentioned output portion is received by the bridge means to unbalance said bridge means to a degree proportional to the frequency of the frequency to be measured.

17. Apparatus as in claim 16 wherein said means for affecting the second portion of said output of the relay means is connected between the discharging contact points for discharging the condenser when the poles of the armature move against said discharging contact points and wherein said other contact point of said other pole is a charging contact point, the arrangement being such that the condenser is charged through said impedance to cause the bridge means to be unbalanced.

18. In a frequency measuring system, relay means having an armature movable between charging and discharging contact points for producing an output related only in frequency to the frequency to be measured, circuit means connectable by the armature for affecting a portion of the output of said relay means, said circuit means including a condenser connected at one side to the armature and an impedance, bridge means excluding said condenser but including said impedance for receiving said portion of the output and indicating the frequency thereof, a source of voltage connected to the other side of said condenser for charging the condenser when the armature moves against said charging contact point, said source being further connected continuously across the bridge means, and means connected to one of said contact points for affecting a second portion of the output of the relay means, the other contact point being connected to the bridge means, the arrangement being such that when the condenser is alternately charged and discharged, only the first mentioned output portion is received by the bridge means to unbalance the bridge means to a degree proportional to the frequency of the frequency to be measured.

19. Apparatus as in claim 18 wherein said means for affecting a second portion of the output of the relay means is connected to the discharging contact point and the bridge means is connected to the charging contact point, the arrangement being such that the condenser is charged through said impedance to cause the bridge means to be unbalanced.

20. In a frequency measuring system, relay means movable between two positions in response to predetermined successive excursions of a fluctuating input signal, circuit means responsive to the relay means and including means to differentiate the output of said relay means for generating single polarity output pulses of one form in amplitude and time duration for all frequencies of the input signal, and bridge means including a portion of said circuit means responsive to said output pulses for indicating the frequency of said input signal.

References Cited in the file of this patent

UNITED STATES PATENTS

| | | |
|---|---|---|
| 2,473,542 | Philpott | June 21, 1949 |
| 2,476,025 | Clark | July 12, 1949 |
| 2,523,297 | Hastings | Sept. 26, 1950 |
| 2,523,399 | Stoner | Sept. 26, 1950 |
| 2,653,290 | Hooven | Sept. 22, 1953 |

FOREIGN PATENTS

| | | |
|---|---|---|
| 1,033,561 | France | Apr. 8, 1953 |